(12) United States Patent
Shin et al.

(10) Patent No.: US 7,599,958 B2
(45) Date of Patent: Oct. 6, 2009

(54) DATA STORING AND SEARCHING METHOD OF A PORTABLE PLAYER

(75) Inventors: Hyun Bae Shin, Kyunggi-do (KR); Kang Won Jeoung, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/908,547

(22) Filed: Jul. 20, 2001

(65) Prior Publication Data
US 2002/0048105 A1    Apr. 25, 2002

(30) Foreign Application Priority Data
Jul. 28, 2000    (KR) ................................. 2000-43865

(51) Int. Cl.
*G06F 17/30*    (2006.01)
(52) U.S. Cl. ........................... 707/104.1; 707/E17.009; 711/208; 711/E12.078; 369/272.1
(58) Field of Classification Search .................... 707/1, 707/200–206, 100, 3, 101, 104.1, E17.009; 369/272.1, 275.3, 13.05, 13.06, 30.01, 3.04, 369/47.12, 13.01; 711/208, E12.078
See application file for complete search history.

(56) References Cited

U.S. PATENT DOCUMENTS 5,243,582 A * 9/1993 Yamauchi et al. ........ 369/30.04
5,689,704 A * 11/1997 Yoshida et al. ............... 711/111
5,867,466 A * 2/1999 Igarashi et al. ........... 369/53.24
5,897,652 A    4/1999 Maeda ........................ 711/100
5,963,961 A * 10/1999 Cannon et al. .............. 707/202
6,577,589 B1 * 6/2003 Sawabe et al. ........... 369/275.3

FOREIGN PATENT DOCUMENTS

JP    06-309121    11/1994
KR    10-1994-024574    11/1994

OTHER PUBLICATIONS

Korean Office Action dated Apr. 24, 2002.

* cited by examiner

*Primary Examiner*—Leslie Wong
(74) *Attorney, Agent, or Firm*—KED & Associates, LLP

(57) ABSTRACT

The present invention relates to a digital audio layer and an audio content file management method of a digital audio player. This method writes address of an recording area containing descriptive information such as title of a song and a singer's name for each stored audio file in a file management information area for a corresponding audio file. Then, descriptive information can be directly searched and displayed more quickly using the written address if an audio file is selected.

42 Claims, 4 Drawing Sheets

Background Art

| Field Name | Size in Byte |
|---|---|
| File Name | 8 |
| File Extension | 3 |
| Attribute | 1 |
| Reserved | 10 |
| Created Time | 2 |
| Created Date | 2 |
| Start Cluster | 2 |
| File Size | 4 |

DATA STORING AND SEARCHING METHOD OF A PORTABLE PLAYER

BACKGROUND OF THE INVENTION

1. Field of the Invention

The present invention relates to an audio content file management method and apparatus, and in particular, to a method of a portable MP3 player that enables descriptive information of a MP3 audio file to be acquired and displayed quickly.

2. Background of the Related Art

A digital audio player can playback digitized audio data stored within the device in a standard format, such as MP3. MP3 digital audio data files are stored in nonvolatile memory, such as a flash-RAM memory card. In general, the files are organized on the storage device using a DOS-like logical memory allocation structure. An example of this organization is shown in FIG. 1 for the case of audio data stored on a memory card 30. As shown in FIG. 1, the allocation structure has a memory management information area and an audio data area. The memory management information area is partitioned into a boot sector, a file allocation table (FAT) containing information on data cluster locations and blank cluster locations, and a directory area. In a DOS system, one cluster is four 512-byte sectors. Therefore, a four MB MP3 file has about 2000 clusters, which may be written contiguously or dispersedly in the audio data file area.

The files are retrieved and reconstructed based on information written in the directory and the FAT. FIG. 2 shows a related art 32-byte-long directory entry composed of an 8-byte file name, 3-byte extension, 1-byte attribute, 10-byte reserved field, 2-byte creation time, 2-byte creation date, 2-byte start cluster location, and 4-byte file size. Beginning with the start cluster location stored in the directory, the files are reconstructed in the proper ordered sequence on a cluster-by-cluster basis, by referring to cluster location information stored in the FAT.

In addition to the audio data, MP3 files also contain descriptive information such as title of song and the artist's name. The descriptive information is used for displaying on a screen for the user. The descriptive information is appended to the last cluster of the file, following the string "TAG".

As described above, the related art digital audio player and memory allocation structure have various disadvantages. If it is desired to retrieve and display the descriptive information of particular MP3 file, about 2000 clusters are traced sequentially from the start cluster location in the 2-byte start cluster directory entry for the file, to the last cluster containing the string "TAG" using the cluster location information stored in the FAT. The necessity for following the entire chain of linked clusters, in order to retrieve the descriptive information, results in an undesirable delay in the presentation of the information to the user.

SUMMARY OF THE INVENTION

An object of the invention is to solve at least the above problems and/or disadvantages and to provide at least the advantages described hereinafter.

Another object of the present invention is to provide a method and apparatus for locating data in a data file stored in a memory.

Another object of the present invention is to provide an audio data file management method and apparatus that enables descriptive information to be retrieved without sequential tracing of multiple clusters.

Another object of the present invention is to provide an audio data file management method and apparatus that writes information into a reserved segment of the directory entry for a corresponding audio data file that indicates the location of descriptive information pertaining to the corresponding audio data file, which can then be retrieved without following the linked-chain format of data clusters forming the audio data file, in order to directly locate the descriptive information more rapidly.

Another object of the present invention is to provide a digital audio player and method where the descriptive information can be rapidly displayed to the user.

To achieve at least the above objects and advantages in a whole or in parts and in accordance with the purpose of the present invention, as embodied and broadly described, a method for locating information from within a data file stored in a memory device includes writing a pre-specified marker in a prescribed reserved area of a directory entry for the data file and writing address information indicative of a location of the information in the data file, wherein the address information is written in the reserved area of the directory entry in a prescribed relationship with the pre-specified marker.

To further achieve at least the above objects and advantages in a whole or in parts and in accordance with the purpose of the present invention, as embodied and broadly described, a method for retrieving information in a data file includes detecting whether a prescribed marker is written in a reserved area of the management entry for the data file and reading address information from the reserved area of the management entry that is indicative of a location of the information in the data file.

To further achieve at least the above objects and advantages in a whole or in parts and in accordance with the purpose of the present invention, as embodied and broadly described, a method for accessing descriptive information of an audio file includes storing input audio data file in a storage device, writing address information of the stored audio data file in an address information area using a file allocation table, writing a selected address of the address information in a reserved area of the storage device indicative of a location of the descriptive information of the audio data file, writing a prescribed code in a part of the reserved area, wherein the prescribed code indicates the selected address of the address information has been written in the reserved area, checking whether the prescribed code is written in the reserved area of the storage device, reading the selected address written in the reserved area when the prescribed code is in the reserved area, acquiring address information of a last part of the audio data file according to a first area of the audio data file pointed by the selected address, checking whether there is a start indicator of the descriptive information of the audio data file in a second area pointed by the acquired address information of the last part of the audio data file, and directly extracting the descriptive information of the audio data file from one of the audio data file following the start indicator and from the first area pointed by the selected address, and displaying the extracted descriptive information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
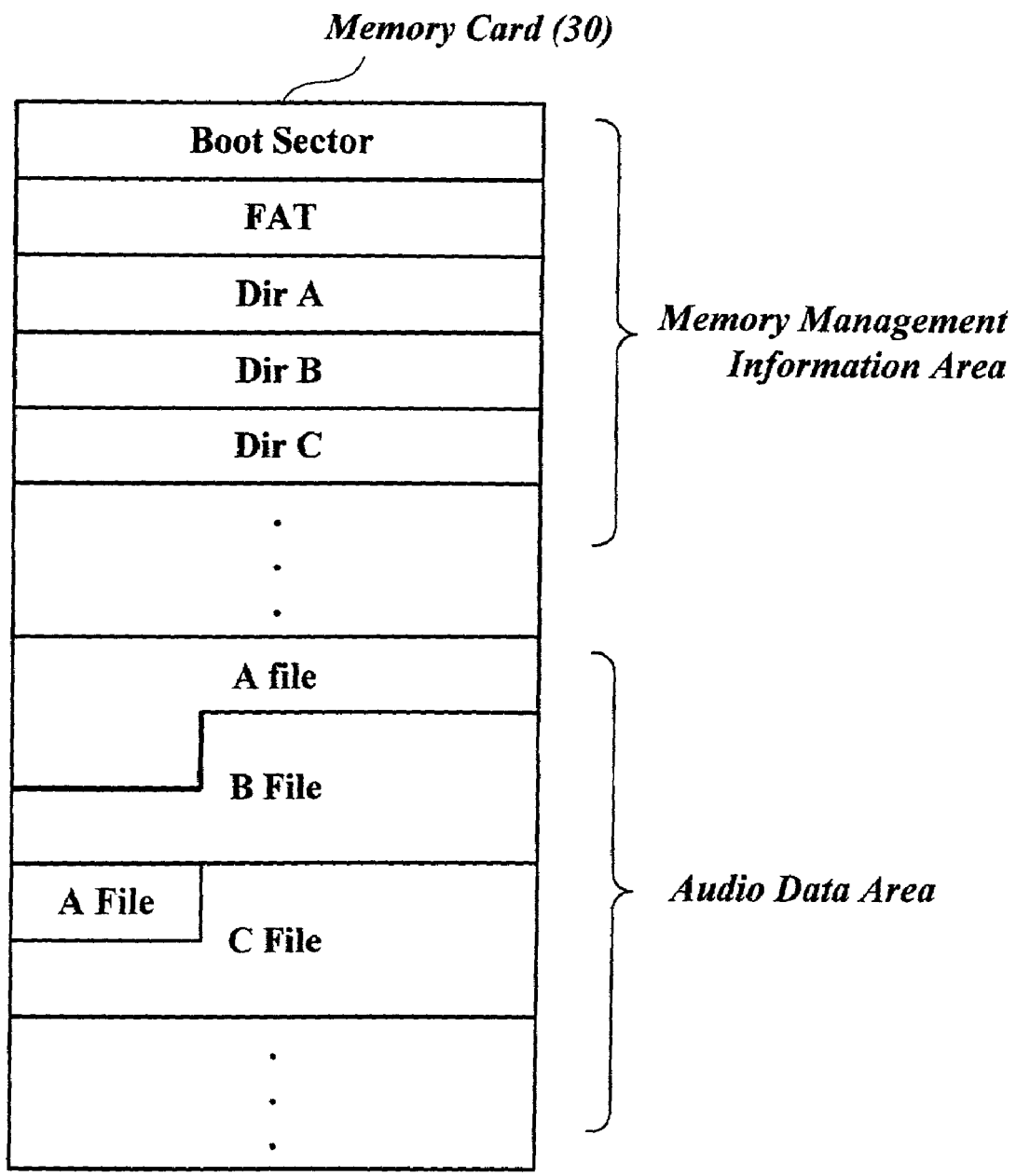
FIG. 1 is an exemplary memory management structure for audio data files stored on a memory card.
Figures 2, 3:
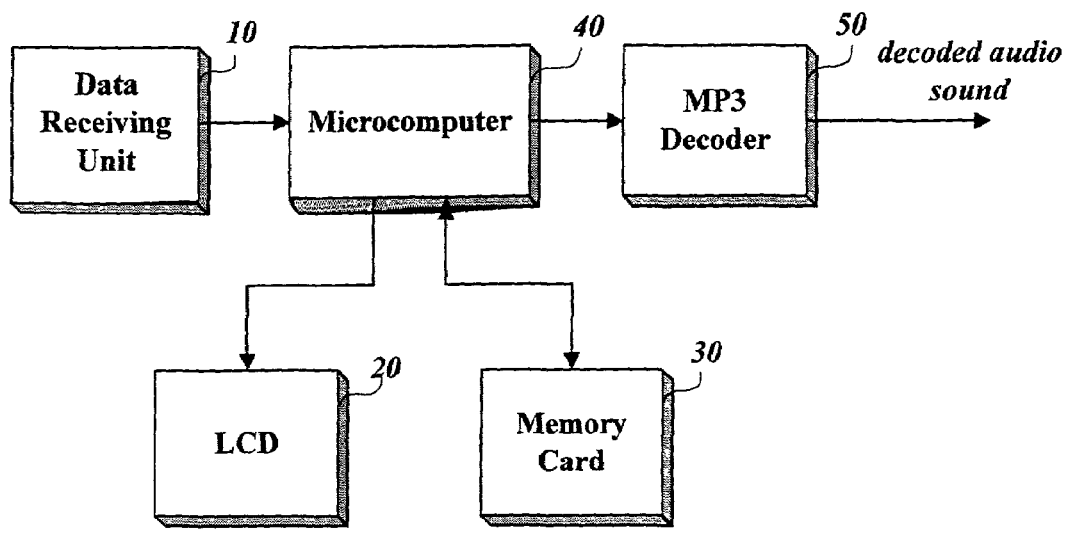
FIG. 2 is a related art directory entry for a 32-byte-long directory structure.
FIG. 3 is a diagram that shows a partial block diagram of a preferred embodiment of a MP3 player according to the present invention.

FIG. 3 is a simplified block diagram that shows a digital audio player according to a preferred embodiment of the present invention. The preferred embodiment of the digital audio player as described is that of an MP3 player, where MP3 refers to an audio data format standard well known in the art. However, the present invention is not intended to be so limited. The elements of the MP3 player of the preferred embodiment include a data receiving unit 10 for receiving data and instructions, for example the user's selection of a song for playback. An LCD 20 displays information to the user, such as a title of the selected song and the artist's name. A memory card 30 stores the MP3 audio data files and their management information. A microcomputer 40 controls the reconstruction and playback of the MP3 audio data, and controls the functioning of various internal elements. An MP3 decoder 50 decodes MP3 audio data stored in the memory card 30 to generate the audible signal corresponding to the selected song.

Figure 4:
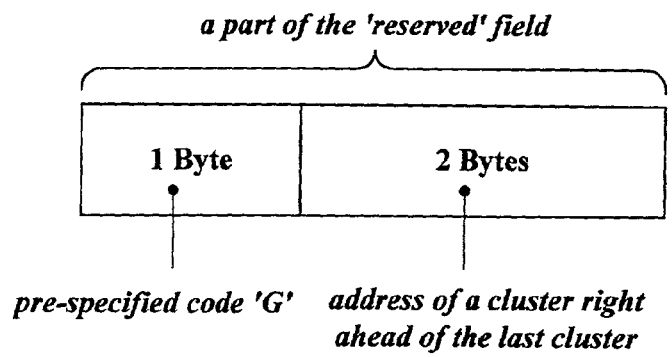
FIG. 4 is a diagram that shows an exemplary segment of a reserved field according to a preferred embodiment of the present invention.

When an audio data file is originally downloaded to the MP3 player via the data receiving unit 10, and stored on its memory card 30, microcomputer 40 preferably directs a 1-byte specific code to be written in the 10-byte reserved field of the directory entry created for the audio data file. For example, the letter "G" could be written, and indicates to the microcomputer 40 that a cluster address has also been written in the reserved field of the directory entry, and will preferably immediately follow the 1-byte specific code. Thus, the 2 bytes following the letter "G" are preferably data indicative of the location of the cluster immediately preceding the final cluster in the file, where descriptive information may be found. The structure of an exemplary segment of the reserved field including this data is illustrated in FIG. 4. The reason for identifying the penultimate cluster in the reserved field rather than the final cluster is because the descriptive information may straddle the last two clusters, rather than be contained entirely within the final cluster. In other words, the descriptive information can sometimes not fit in the final cluster and is then written to the final two clusters.

Figure 5:
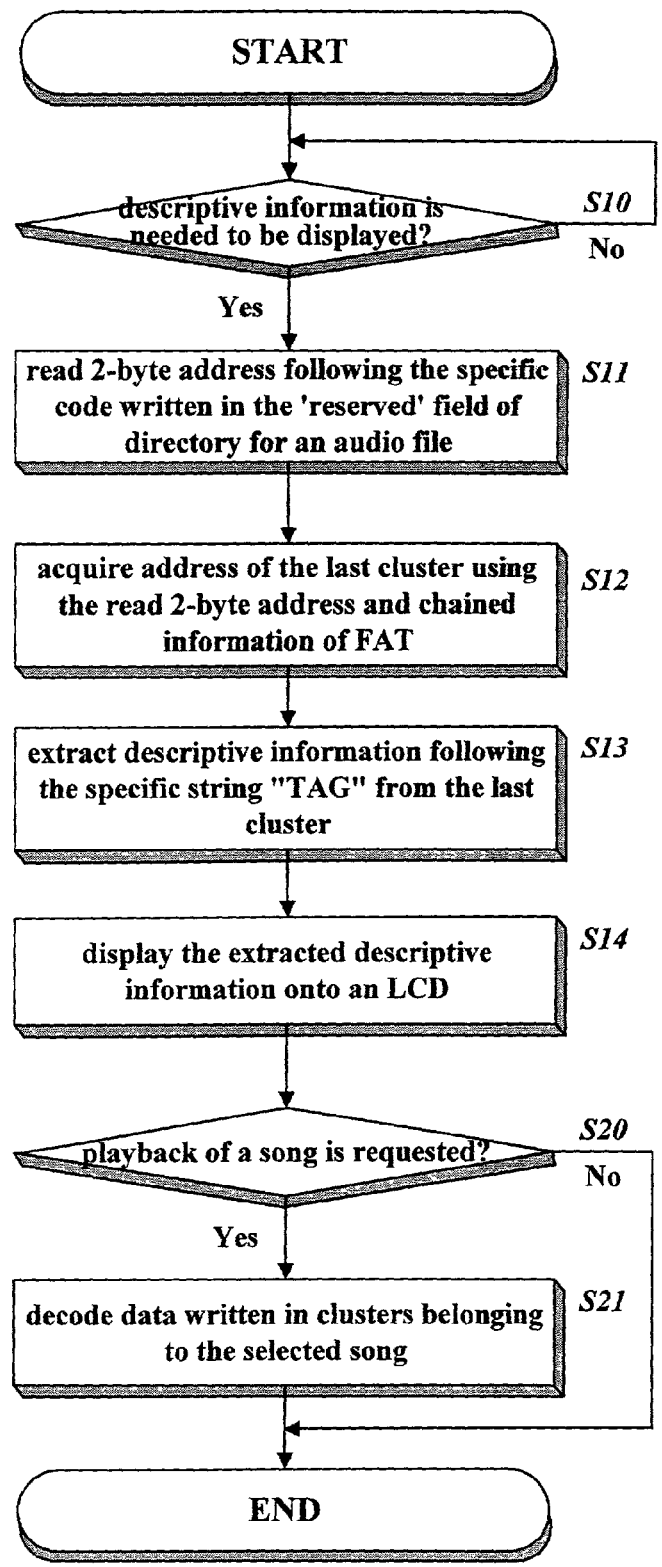
FIG. 5 is a flow diagram that shows a preferred embodiment of an audio data file management method according to the present invention.

Operations of a preferred embodiment of a method for managing an audio data file according to the present invention will now be described using the flow chart of FIG. 5. The preferred embodiment of a method for managing an audio data file can be used, for example, in the preferred embodiment of the digital audio player shown in FIG. 3. As shown in FIG. 5, after starting upon receiving a request to display descriptive information for any particular song or group of songs, the microcomputer 40 directs a check of the reserved area of the directory entry for the selected song(s), for the presence of a previously stored 1-byte prescribed code or marker, e.g., "G" in FIG. 4 (S10). If the marker "G" is detected, the microcomputer 40 proceeds to read out the following 2-byte address (S11) for the penultimate cluster. Otherwise, the process returns to check for the descriptive information at a later point in time. The microcomputer 40 then acquires the address of the last cluster by reference to the cell of FAT addressed by the read 2-byte penultimate cluster address (S12). This cell of the FAT is preferably the address of the last cluster of the file.

The microcomputer 40 preferably locates the last cluster of the audio data file in the audio data area of the memory card 30 based on the acquired address, and reads out data written in the last cluster while checking for the string "TAG". If the string "TAG" is detected, the microcomputer 40 extracts the descriptive information, for example the title of the song and the artist's name (S13). If the string "TAG" is not found, the microcomputer 40 preferably reads out data written in the penultimate cluster, whose address has been previously acquired. If "TAG" is then detected in the penultimate cluster, the descriptive information following the string "TAG" is extracted. Thus, the descriptive information is found without sequentially searching the first through second-to-last clusters in the audio data file of the audio data area using linking data, for example, from the FAT. The located descriptive information in the last cluster (or penultimate cluster) is displayed on the LCD screen 20, and/or any other display such as those on a remote controller (S14). Use of this process reduces the response time of the player to display the descriptive information to the user, relative to the related art, as the descriptive information is accessed directly rather than by linking the clusters through the entire file before encountering the desired data field.

If playback of the song or group of songs is requested (S20), the microcomputer 40 acquires an address of start cluster from the directory associated with the each selected song, reads data written in that cluster, and sends the data to the decoder 50 to output audio sound (S21), then preferably, the process ends. For searching and reading next clusters, the microcomputer 40 makes reference to the chain information contained in the FAT. If the address of the start cluster cannot be located by the microcomputer 40, the process preferably ends.

Figure 6:
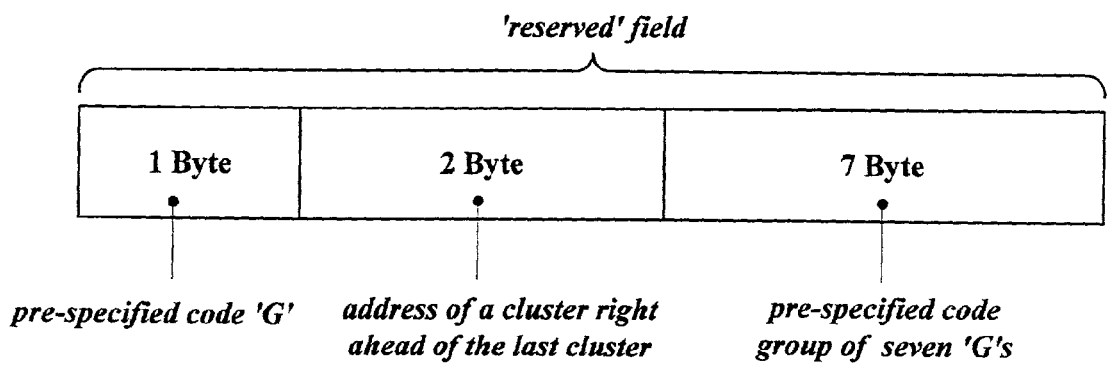
FIG. 6 is a diagram that shows an exemplary alternative embodiment of information forming the reserved field according to a preferred embodiment of the present invention.

An alternative exemplary embodiment to that previously described and shown in FIG. 4, is the filling of the remainder of the 10-byte reserved field with additional copies of the marker byte, as shown for example in FIG. 6. The 10-byte reserved field is preferably written with a preceding marker "G", the 2-byte address of the penultimate cluster, followed 7-bytes of repetitious "G"s. Therefore, a remaining area of the reserved field is filled with copies of the marker byte except for byte locations 2 and 3, which contain the cluster address. However, the present invention is not intended to be so limited. This alternative embodiment of the reserved field may provide additional protection against misinterpretation of the data in the reserved field. For example, data of the reserved field can be misinterpreted in the event that the marker byte "G" is erroneously written in the designated area by another operation, which causes the microcomputer 40 to misinterpret the following 2 bytes as a cluster address.

As described above, preferred embodiments of a digital audio player and method of organizing or managing audio data according to the present invention have various advantages. According to the preferred embodiments, descriptive information can be found without performing an ordered search or searching from the first cluster of the plurality of clusters forming an audio data file. Further, the descriptive information can be rapidly and accurately located by storing its address after a prescribed marker or the like in a reserved field of the memory management informational area of a memory card or the like.

The invention may be embodied in other specific forms without departing from the sprit or essential characteristics thereof. The preferred embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for retrieving information located within an audio data file, comprising:
    detecting whether a prescribed marker is written at a first location in a reserved area of a management entry for the audio data file; and
    reading address information from a second location of the reserved area of the management entry when the prescribed marker is detected in the first location, the address information indicative of a location of descriptive information relating to the audio data file, wherein the management entry is provided separately on a storage medium from the audio data file,
    wherein the address information is indicative of a location of a predetermined one of a final plurality of data clusters in which the descriptive information is stored or which is adjacent to one or more final clusters in which the descriptive information is stored, and
    wherein the descriptive information at the location of the predetermined one of the final plurality of data clusters is read without reading intervening data clusters containing music of the audio data file, the descriptive information providing an indication of at least one of a title or an artist associated to a song stored in the MP3 digital audio file.

2. The method of claim 1, further comprising locating the address information using a prescribed relationship to the prescribed marker in the reserved area.

3. The method of claim 1, further comprising directly retrieving the information from the audio data file by locating the information according to the address information written in the reserved area of the directory entry.

4. The method of claim 1, further comprising outputting the information.

5. The method of claim 1, further comprising:
    determining address information of the information by accessing a plurality of data clusters in a sequence according to the file allocation table (FAT) of the audio data file; and
    storing the prescribed marker and the determined address information of the information in the reserved area.

6. The method of claim 1, wherein the address information is indicative of a final data cluster of the audio data file.

7. The method of claim 1, further comprising:
    writing a pre-specified marker in a prescribed reserved area of a directory entry for the audio data file; and
    writing cluster address information corresponding to descriptive information in the audio data file, wherein t the cluster address information is written in the reserved area of the a directory entry in a prescribed relationship with the pre-specified marker.

8. The method of claim 1, further comprising:
    based on the cluster address information, determining whether the descriptive information is located between a first point and an end of the audio data file and
    if the descriptive information is not found, further searching between a second point and the end of the audio data file.

9. The method of claim 8, wherein the address information corresponds to the second point of the audio data file.

10. The method of claim 9, wherein the second point corresponds to a location of a penultimate data cluster of the audio data file.

11. The method of claim 8, wherein the first point is between the second point and the end of the audio data file.

12. The method of claim 1, wherein the prescribed marker indicates an existence of the address information in the reserved area of the directory entry.

13. The method of claim 8, wherein the first point is near the end of the audio data file.

14. The method of claim 1, wherein the address information is indicative of a location of a next-to-last one of the data clusters of the audio data file, the next-to-last one of the data clusters storing the descriptive information.

15. The method of claim 1, wherein the address information is indicative of a location of a last one of the data clusters of the audio data file.

16. The method of claim 1, wherein audio data file is an MP3 digital audio file.

17. A method of retrieving information located within an audio data file, comprising:
    detecting whether a prescribed marker is written in a reserved area of a management entry for the audio data file;
    reading address information from the reserved area of the management entry that is indicative of a location of descriptive information relating to the audio data file, wherein the management entry is provided separately on a storage medium from the audio data file, and
    retrieving the descriptive information based on the read address information, wherein the address information is indicative of a location of a first predetermined one of a final plurality of data clusters corresponding to a first point of the audio data file,
    wherein if the descriptive information is not found at the first point, performing a search operation starting from a second predetermined one of the final plurality of data clusters of the audio data file until the descriptive information is located, and
    wherein the first predetermined one of the final data clusters is searched to locate the descriptive information without searching intervening data clusters containing music of the audio data file.

18. The method of claim 17, wherein the first point corresponds to a penultimate data cluster of the audio data file.

19. The method of claim 18, wherein the first point corresponds to the final data cluster of the audio data file.

20. An apparatus to retrieve information located within an audio data file, comprising:

a controller to detect whether a prescribed marker is written in a reserved area of a management entry for the audio data file and reading address information from the reserved area of the management entry that is indicative of a location of descriptive information relating to the audio data file, wherein the address information is indicative of a location of a predetermined one of a final plurality of data clusters in which the descriptive information is stored or which is adjacent to one or more final clusters in which the descriptive information is stored, wherein the descriptive information at the location of the predetermined one of the final plurality of data clusters is read without reading intervening data clusters containing music of the audio data file, wherein the management entry is provided separately on a storage medium from the audio data file, and wherein the information provides an indication of at least one of a title or an artist associated to a song stored in the audio data file.

21. An apparatus as recited in claim 20, wherein the controller is adapted to locate the address information using a prescribed relationship to the prescribed marker in the reserved area.

22. An apparatus as recited in claim 20, wherein the controller is adapted to directly retrieve the descriptive information from the audio data file by locating the descriptive information according to the address information written in the reserved area of the directory entry.

23. An apparatus as recited in claim 20, wherein the controller is adapted to output the information.

24. An apparatus as recited in claim 20, wherein the controller is adapted to determine address information of the descriptive information by accessing a plurality of data clusters in a sequence according to the file allocation table (FAT) of the audio data file and to store the prescribed marker and the determined address information of the descriptive information in the reserved area.

25. An apparatus as recited in claim 20, wherein the address information is indicative of a location of a penultimate data cluster of the audio data file.

26. An apparatus as recited in claim 20, wherein the address information is indicative of a location of a final data cluster of the audio data file.

27. An apparatus as recited in claim 20, wherein the controller is adapted to write a pre-specified marker in a prescribed reserved area of a directory entry for the audio data file and to write penultimate cluster address information corresponding to descriptive information in the audio data file and wherein the address information is written in the reserved area of the directory entry in a prescribed relationship with the pre-specified marker.

28. An apparatus as recited in claim 20, wherein the controller is adapted to, based on the address information, determine whether the information is located between a first point and an end of the audio data file and, if the information is not found, to further search between a second point and the end of the audio data file.

29. An apparatus as recited in claim 28, wherein the first point is between the second point and the end of the audio data file.

30. An apparatus as recited in claim 28, wherein the address information corresponds to the second point of the audio data file.

31. An apparatus as recited in claim 30, wherein the second point corresponds to a location of a penultimate data cluster of the audio data file.

32. An apparatus as recited in claim 20, wherein the prescribed marker indicates an existence of the address information in the reserved area of the directory entry.

33. A computer-readable medium to store an audio data file having information and to be read by a data reading device, the computer-readable medium comprising:

a management information area to store a management entry for the audio data file, the management entry including a reserved area for storing a prescribed marker and address information that is indicative of a location of descriptive information relating to the audio data file, the management entry being provided separately on a storage medium from the audio data file, wherein the address information is indicative of a location of a predetermined one of a final plurality of data clusters in which the descriptive information is stored or which is adjacent to one or more final clusters in which the descriptive information is stored, and wherein the information in the audio data file provides an indication of at least one of a title or an artist associated to a song stored in the audio data file, wherein the computer-readable medium further comprises:

a directory entry for the audio data file, the directory entry including a prescribed reserved area for storing a pre-specified marker and penultimate cluster address information corresponding to the descriptive information in the audio data file.

wherein the address information is written in the reserved area of the directory entry in a prescribed relationship with the pre-specified marker.

34. A computer-readable medium as recited in claim 33, wherein the address information is located by use of a prescribed relationship to the prescribed marker in the reserved area.

35. A computer-readable medium as recited in claim 33, further comprising:

a file allocation table (FAT) of the audio data file, wherein the address information of the descriptive information is determined by accessing a plurality of data clusters in a sequence according to the file allocation table (FAT).

36. A computer-readable medium as recited in claim 33, wherein the address information is indicative of a location of a penultimate data cluster of the audio data file.

37. A computer-readable medium as recited in claim 33, wherein the address information is indicative of a location of a final data cluster of the audio data file.

38. A computer-readable medium as recited in claim 33, wherein the information is located between a first point and an end of the audio data file and, or between a second point and the end of the audio data file.

39. A computer-readable medium as recited in claim 38, wherein the address information corresponds to the second point of the audio data file.

40. A computer-readable medium as recited in claim 39, wherein the second point corresponds to a location of a penultimate data cluster of the audio data file.

41. A computer-readable medium as recited in claim 38, wherein the first point is between the second point and the end of the audio data file.

42. A computer-readable medium as recited in claim 33, wherein the prescribed marker indicates an existence of the address information in the reserved area of the directory entry.

* * * * *